United States Patent
Stockhausen et al.

(10) Patent No.: US 6,207,780 B1
(45) Date of Patent: Mar. 27, 2001

(54) INTERPOLYMERS OF UNSATURATED CARBOXYLIC ACIDS AND UNSATURATED SULFUR ACIDS

(75) Inventors: Dolf Stockhausen; Helmut Klimmek, both of Krefeld; Frank Krause, Kleve; Matthias Berghahn, Krefeld, all of (DE)

(73) Assignee: Rohm & Haas Company, Philadelphia, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/925,460
(22) Filed: Sep. 8, 1997

Related U.S. Application Data

(63) Continuation of application No. 08/594,675, filed on Feb. 2, 1996, now abandoned.

(30) Foreign Application Priority Data

May 12, 1995 (DE) .............................. 195 16 957

(51) Int. Cl.$^7$ .................................. C08F 228/02
(52) U.S. Cl. .......................... 526/287; 510/276
(58) Field of Search ................... 526/287, 318.1

(56) References Cited

U.S. PATENT DOCUMENTS

| 4,743,668 | 5/1988 | Fong et al. ........................ 526/304 |
| 5,115,060 | 5/1992 | Grey .................................. 526/262 |
| 5,135,677 | 8/1992 | Yamaguchi et al. . | |

FOREIGN PATENT DOCUMENTS

| 2 212 623 | 9/1973 | (DE) . |
| 30 22 924 | 1/1981 | (DE) . |
| 32 33 776 | 3/1984 | (DE) . |
| 32 33 778 | 3/1984 | (DE) . |
| 32 44 989 | 6/1984 | (DE) . |
| 33 20 864 | 12/1984 | (DE) . |
| 34 13 301 | 10/1985 | (DE) . |
| 34 26 368 | 1/1986 | (DE) . |
| 37 00 535 | 7/1988 | (DE) . |
| 37 43 739 | 7/1989 | (DE) . |
| 41 31 338 | 3/1993 | (DE) . |
| 42 12 755 | 10/1993 | (DE) . |
| 42 21 863 | 1/1994 | (DE) . |
| 43 00 772 | 7/1994 | (DE) . |
| 43 05 396 | 8/1994 | (DE) . |
| 43 43 993 | 6/1995 | (DE) . |
| 43 44 029 | 6/1995 | (DE) . |
| 0 184 414 | 6/1986 | (EP) . |
| 0 396 303 | 11/1990 | (EP) . |
| 0 404 377 | 12/1990 | (EP) . |
| 0 497 611 | 8/1992 | (EP) . |
| 0 622 449 | 11/1994 | (EP) . |
| 0 622 449 A2 | 11/1994 | (EP) . |
| 0 625 567 A2 | 11/1994 | (EP) . |
| 0 637 627 | 2/1995 | (EP) . |
| 0 637 627 A2 | 2/1995 | (EP) . |
| 118730 | * 9/1981 | (JP) . |
| WO 94/18296 | 8/1994 | (WO) . |

OTHER PUBLICATIONS

Römpp Chemie Lexikon, 9. Auflage, 1991, Georg Thieme Verlag, Stuttgart, New York, Band 4, Stichwort "Phosphate".
Entscheidung der Beschwerdekammern des EPA: T 12/81 vom. 9.2. 1982.
Entscheidung der Beschwerdekammern des EPA: T 365/89 vom 10.4.1991.
Entscheidung der Beschwerdekammern des EPA: T 12/90 vom 23.8 1990.
Hollemann–Wiberg, Lehrbuch der Anorganischen Chemie, de Gruyter, 91.–100. Auflage, Berlin, New York 1985, Seite 505.
Römpp Chemie Lexikon, 9. Auflage, 1991, Georg Thieme Verlag, Stuttgart, New York, Band 5, Stichwort "Suspensionen", hier beigefügt als Ausdruck der CD–ROM–Version 1.0, 1995.
Römpp Chemie Lexikon, 9. Auflage, 1990, Georg Thieme Verlag, Stuttgart, New York, Band 2, Stichwort "Grenzflächenaktive Stoffe", hier beigefügt als Ausdruck der CD–ROM–Version 1.0, 1995.

(List continued on next page.)

Primary Examiner—Christopher Henderson
(74) Attorney, Agent, or Firm—Oblon, Spivak, McClelland, Maier & Neustadt, P.C.

(57) ABSTRACT

The present invention relates to water-soluble polymers built up of
a) monoethylenically unsaturated dicarboxylic acids and/or their salts,
b) monoethylenically unsaturated monocarboxylic acids and/or their salts,
c) monounsaturated monomers which, after hydrolysis or saponification, can be converted into monomers having a hydroxyl group covalently bonded at the C—C-chain,
d) monoethylenically unsaturated sulfonic acid groups or sulfate groups-containing monomers, and optionally
e) further radically copolymerizable monomers,
with the sum of the monomers of a) to e) amounting to 100%.

The present invention further relates to a process for the production of these polymers by radical polymerization and hydrolysis in aqueous medium, and to the use of these polymers as additive or cobuilder in detergents and cleaners, in the pretreatment of cotton, as bleaching stabilizers, as auxiliary agent in textile printing, and in the manufacture of leather, as well as for the inhibition of water hardness, and as dispersing agent as well as detergents and cleaners.

3 Claims, No Drawings

OTHER PUBLICATIONS

Römpp Chemie Lexikon, 9. Auflage, 1989, Georg Thieme Verlag, Stuttgart, New York, Band 1, Stichwort "Builder", hier beigefügt als Ausdruck der CD–ROM–Version 1.0, 1995.

Römpp Chemie Lexikon, 9. Auflage, 1990, Georg Thieme Verlag, Stuttgart, New York, Band 2, Stichwort "Entschlictungsmittel", hier beigefügt als Ausdruck der CD–ROM–Version 1.0, 1995.

Hans Andree, et al., Henkel–Referate 23, pp. 7 to 11, Kombinationen von Zeolith A Mit Verschiedenen Co–Buildern in Waschmitteln, 1987.

Derwent Abstract, AN 90–111379, JP 02061178, Mar. 1, 1990.

\* cited by examiner

INTERPOLYMERS OF UNSATURATED CARBOXYLIC ACIDS AND UNSATURATED SULFUR ACIDS

This application is a Continuation of application Ser. No. 08/594,675, filed on Feb. 2, 1996, now abandoned.

The present invention relates to water-soluble copolymers having OH-groups directly covalently bonded at the polymer chain and based on unsaturated mono- and dicarboxylic acids, vinyl esters or ethers, and sulfonic acid/sulfate-group-containing monomers. The present invention further relates to a process for their production and to their use in detergents and cleaners, in the inhibition of water hardness, as dispersing agents, and in the production, finishing and/or dyeing of textile fibers and textiles, and in the manufacture of leather.

Since ecological considerations have come to the fore within the last years, many of the efforts to develop new polymers have been focused on their biodegradability. Products whose application and disposal is effected in aqueous systems have been of particular interest. In some fields, for example, the papermaking industry, degradable polymers such as starches have been used as binders more frequently; in other fields, graft polymers of renewable raw materials, such as starch or sugar, and of synthetic monomers have been developed. However, for many applications there are relatively high technical requirements, and the products based on renewable raw materials are not able to meet these standards to the degree the purely synthetic polymers used until today do. A typical example is the use of polycarboxylates in mixed sizes for textile fibers; here a mixture of starch and polycarboxylate is frequently used as a compromise between degradability and sizing properties.

Another important field of application for water-soluble polymers is the use in detergents and cleaners.

During the last years, the development on this sector has been determined by the substitution of polyphosphate components which—as is generally known—result in overfertilization of the waters and, consequently, in the problems known as eutrophication.

In addition to the primary cleaning effect, polyphosphates have a favorable secondary detergent behavior; they remove alkaline-earth metal ions from the wash liquor, textiles and dirt, prevent precipitations of insoluble alkaline-earth metal salts on the textiles, and maintain the dirt in the washing liquor in disperse condition. In this manner incrustations and redepositions are suppressed even after several wash cycles. Due to their binding capacity for alkaline-earth ions and their dispersing and soil-carrying capacity, polycarboxylates, such as polyacrylic acids and acrylic acid/maleic acid copolymers, are currently on the market as substitutes for polyphosphates. The latter property is achieved in a particularly easy manner by using acrylic acid/maleic acid copolymers [Richter, Winkler in Tenside Surfactants Detergents 24 (1987) 4]. Such polymers are described, for example, in the patent applications DE 32 33 776 A1 and EP 76 992 B1.

DE 32 33 776 A1 describes a process for the production of copolymers comprising mono- and dicarboxylic units, which is characterized by using a specific hydrogen peroxide/peroxodisulfate-initiator ratio. According to this invention, 10–60%-wt. of dicarboxylic acid monomer/anhydride, 90–40%-wt. of monocarboxylic acid, and optionally 0–20%-wt. of monomers not containing carboxyl groups, which, however, are not regarded as absolutely necessary, are used and polymerized in aqueous medium at 60–150° C. under partial neutralization.

EP 76 992 B1 describes polymeric organic acids, a process for their production, and their use in detergents and cleaners. 50–95%-wt. of unsaturated monocarboxylic acid, 0.5–5%-wt. of monomers without acid function, and 0–49%-wt. of unsaturated dicarboxylic acid are reacted in a bulk polymerization process, and used in detergents as builder and incrustation inhibitor, optionally after neutralization. The acid-free monomers are selected from the group of vinyl and acrylic ester.

The problem of eutrophication has been answered with the use of polycarboxylates. However, these synthetic polymers must be regarded as being substantially inert towards degradation processes. Because of the already existing and the coming increasing spread of said polymers, the question of where they remain in the ecosystem arises. Examinations to this respect showed that about 90% of the polycarboxylates are adsorbed to and disposed by the sewage sludge, i.e. by dumping, agricultural utilization, or combustion. Biological degradation takes place to a very limited extent, the cited degradation rates amounting to between 1 and 10%. The statements to this respect can be found in the publications of J. Lester et al. "The partitioning of polycarboxylic acids in activated sludge", Chemosphere, Vol. 21, Nos. 4–5, pp 443–450 (1990), H. Schumann "Elimination von $^{14}$C-markierten Polyelektrolyten in biologischen Abwasserreinigungsprozessen, Wasser—Abwasser (1991), pp 376–383, P. Berth "Möglichkeiten und Grenzen des Ersatzes von Phosphaten in Waschmitteln", Angewandte Chemie (1975), pp 115–142.

Introducing large amounts of non-degradable compounds in the environment is critical from the ecological point of view. To solve this problem it seems to be obvious to use biodegradable polymers, i.e., those demineralizable to carbon dioxide and water, or to improve the effectiveness of commercial polycarboxylates in such a manner that the concentrations used can be lowered or that they can assume the functions of other detergent components in order to relieve the environment.

DE 43 27 494 A1 describes the production of polyaspartic acid imides. Such polycondensates are designed for the use as additives in detergents and cleaning agents. EP 633 310 A1 also describes the use of these polymers of limited biodegradability as builders in detergents. In general however, these polymers have a low binding and dispersing capability as compared to polycarboxylates, i.e., they are less effective. Under washing conditions, i.e., alkali and elevated temperature, they have the additional disadvantage of destroying the polymer by hydrolysis/saponification under simultaneous ammonia cleavage. These phosphate substitutes represent an ecological problem since the nitrogen bonded to the polymer would as a fertilizer promote the eutrophication of the waters already known from phosphates.

The production of a biodegradable polycarboxylate polymer based on glyoxylic acid esters is known from U.S. Pat. No. 4,144,226. To achieve technically interesting molecular weights, the mentioned polymerization method in anhydrous organic solvents requires temperatures of 0° C. or less, achieving polymer yields of only 75%, followed by further yield-reducing isolation and cleaning steps. Since the polymer is instable in the acid or alkaline pH-range, the end groups thereof must additionally be blocked chemically. Nevertheless, reduced molecular weight caused by chain scission involving loss of activity may occur during the detachment of the carboxyl groups from the ester form by means of saponification. Said polymers are not suitable for the use in large amounts in the aforementioned applications because very costly and commercially unavailable monomers and very expensive polymerization and processing techniques are to be employed, in addition they exhibit the described instability.

The patent GB 1 385 131 describes a detergent composition using a biodegradable polymer of maleic acid and vinyl alcohol units. The production process includes a precipitation polymerization in benzene, the separation and drying of the polymer, and its hydrolysis and saponification in an aqueous alkaline medium. Leaving the relatively complicated and costly production of these polymers out of consideration, additional disadvantages with respect to degradability and property profile become apparent. According to the indications relating to degradability, a drastic decrease in degradation goes along with the increase in molecular weight. A molecular weight increase from 4,200 to 18,000 already means a reduction in the degradation by 63%. With respect to the properties it must be mentioned that an inhibition of soil redeposition which is superior to sodium tripolyphosphate can only be achieved in detergent formulations with the maleic acid/vinyl alcohol polymer content amounting to at least 35%. In view of the art, these uneconomically high polymer concentrations in detergents are disadvantageous; currently used detergent formulations comprise about 5% of polymer (DE 40 08 696).

According to GB 1 284 815 maleic acid-vinyl alcohol copolymers are also used as substitutes for phosphate in detergents and cleaning agents. It is recommended to use 10–80%-wt., preferably 15–60%-wt., relative to the detergent or cleaning agent; again, this is also an uneconomically high concentration and, in addition, it points to a poor efficiency if lower concentrations are used.

EP 0 497 611 A1 describes the production and the use of improved and partially biodegradable polymers based on maleic acid, acrylic acid and vinyl acetate, which are polymerized in an organic solvent and subsequently subjected to an aqueous hydrolysis. Furthermore, the possibility of modifying the polymers by subsequent saponification, optionally followed by an oxidation reaction is described. As compared with the aqueous procedure, the polymerization in an organic solvent is described as a necessary method since, on the one hand, any desired monomer ratio may be realized in the polymer and, on the other hand, undesired hydrolysis reactions of the monomers cannot occur. The degradability of the terpolymers according to EP 0 497 611 A1 was tested in a Closed-Bottle-Test and assessed within a scale of 0 to 100% BOD (Biological Oxygen Demand) after 25 days. A pure polyacrylic acid having 1.8% and a copolymer of maleic acid and vinyl acetate having 8% degradability are mentioned in said test run. The products manufactured in the organic solvent were examined in hydrolyzed and saponified form with different mole ratios of the monomers used, resulting in a biological degradation of 13.6–28.9%.

EP 0 398 724 A2 describes a process for the production of maleic acid/acrylic acid copolymers in aqueous solution, wherein acid-free monomers may also be used. Said production process is based in particular on the specific simultaneous dosage of all monomer components and other reagents necessary for the polymerization. Although no particular emphasis is given to the biodegradability of the polymers, these values are measured in three comparative examples. Example 1 illustrates the production of a copolymer of maleic acid and acrylic acid and indicates the biodegradation after 30 days with 3.3% (BOD). Example 5 describes a copolymer of maleic acid, acrylic acid and 10.6%-wt. of vinyl acetate having a biodegradation of 9.6% (BOD) after 30 days. Example 6 describes a copolymer of maleic acid, acrylic acid and 10.6%-wt. of 2-hydroxyethylmethacrylate having a degree of degradation of 7% after 30 days.

U.S. Pat. No. 3,887,480 describes detergents and cleaning agents produced on the basis of polymers of 35–70 mole-% of maleic acid, 20–45 mole-% of vinyl acetate, and 2–40 mole-% of acrylic acid. Among other things, the invention is based on the finding that the monomer reaction in aqueous manner can be increased by very large amounts of persulfate initiator. Saponification of the polymerized vinyl acetate monomers does not take place, there is no biodegradability.

EP 0 193 360 B1 describes granular detergent compositions having a phosphate content of below 5%-wt.; in addition to zeolite they use 0.1 to 20%-wt. polymers of dicarboxylic acid anhydride, monocarboxylic acid anhydride, and a nonionic spacer monomer of the type acrylate ester, vinyl ester or vinyl alcohol. The production of the terpolymers is not mentioned, further comonomers are not used. Test results with respect to application technology are not given.

U.S. Pat. No. 3,879,288 describes a process for suppressing the water hardness by adding polymers based on fumaric acid and allyl sulfonate monomer. Owing to the low polymerization activity of the monomer components the polymer solutions comprise intolerably high residual monomer proportions; they have a low binding and dispersing capacity.

DE 43 00 772 A1 describes the production of terpolymers having an improved degradability as compared to the art. The terpolymers mentioned are built up in aqueous medium of monomers of the type monounsaturated dicarboxylic acids, monocarboxylic acids, and monomers which after hydrolysis can be converted into polymeric constitutional units having a hydroxyl group covalently bonded to the C—C-polymer chain. The polymers of DE '772 may optionally comprise up to 10%-wt. of further, radically copolymerizable monomers.

Although polymers based on the above-mentioned monomers according to DE 43 05 396 A1 or DE 43 26 129 A1 have better properties in washing and dispersion tests than the commercial maleic acid/acrylic acid copolymers, their property of complexing higher metal ions, for example iron(III) ions must in view of commercial complexing agents, such as EDTA, NTA, and alkyl phosphonates, be improved further to avoid or at least reduce the use of these ecologically doubtful substances. Also, the anti-redeposition properties, which are measured by the dispersing action of soil particles during the washing process, should be improved with respect to an economically and ecologically desired restriction of the amounts of detergent components. With regard to the processibility under alkaline conditions the polymers have a limited stability, i.e., the polymer solutions start to flake under alkaline conditions. The polymers make it possible to prevent precipitations of hard water, but also in this case an improved efficiency is required in view of economy and ecology in order to reduce the polymer concentrations in feedwater and industrial water. The viscosity of the polymers at a given active substance is lower than that of commercial detergent polymers based on maleic acid/acrylic acid, however, for reasons of handling and further processing an even lower viscosity is desired. The requirements of the market are directed to low viscosity with maximum concentration of active substance.

The terpolymers according to DE 43 00 772 A1 can be produced with low residual monomer contents, but with respect to the unsaturated dicarboxylic acids the content of maleic acid is always higher than that of the physiologically acceptable fumaric acid.

Accordingly, there was the object to improve the terpolymers according to DE 43 00 772 A1 with respect to their property profile. An increased binding capacity for higher metal ions, particularly for calcium(II) and iron(III) ions and in particular at elevated temperatures during washing processes, is desired for the use in auxiliaries, cleaners, fiber and textile treatment agents. In addition, an increased dispersing and suspending action for pigment and dirt particles is required to improve the effectiveness in washing processes and, for example in detergent precursors, the optionally alkaline dispersion and stabilization of zeolite-particles in aqueous phase. As a general improvement which is of particular importance for the incorporation of polymers into liquid detergents or into mixtures designated for spray drying, the polymer solutions are to have the lowest possible viscosity with the highest possible dry substance. Moreover, the activity as anti-deposition agent or crystallization inhibitor is to be increased so that the active amount can be reduced, for example, when the polymers are used for process waters in heat exchangers, steam generators, or in concentrating sugar syrups. When the polymers are used in the leather manufacture it is important that they fix chromium and give fullness, softness, tightness of grain and color. The biodegradability should be preserved when the polymers are modified. With respect to the residual monomer content a further reduction is to be achieved, and the maleic acid portion in the mixture of unsaturated dicarboxylic acids is to be realized at the same time.

Most surprisingly, this object has been achieved by the production and use of copolymers obtainable by radically polymerizing monomer mixtures of a) 10–70%-wt. of monoethylenically unsaturated $C_{4-8}$-dicarboxylic acids or their salts b) 20–85%-wt. of monoethylenically unsaturated $C_{3-10}$-monocarboxylic acids or their salts c) 1–50%-wt. of monounsaturated monomers which, after hydrolysis or saponification, release hydroxyl groups bonded at the polymer chain d) 0.1–40%-wt. of monoethylenically unsaturated monomers comprising sulfonic acid groups and/or sulfate groups e) 0–10%-wt. of further radically copolymerizable monomers, with the sum of the monomers according to a) to e) amounting to 100%, in aqueous solution and subsequently saponifying the monomer components according to c).

Suitable monomers of group a) include monoethylenically unsaturated $C_4$–$C_8$-dicarboxylic acids, their anhydrides or their alkali and/or ammonium salts and/or amine salts. Suitable dicarboxylic acids, for example, are maleic acid, fumaric acid, itaconic acid, methylene malonic acid. It is preferable to use maleic acid, maleic anhydride, itaconic acid, itaconic anhydride, as well as the corresponding sodium, potassium or ammonium salts of maleic or itaconic acid. The monomers of group a) are present in the monomer mixture to the extent of 10–70%-wt., preferably 20–60%-wt., and most preferably 25–55%-wt.

Suitable monomers of group b) include monoethylenically unsaturated $C_3$- to $C_{10}$-carboxylic acids and their alkali and/or ammonium salts and/or amine salts. These monomers include, for example, acrylic acid, methacrylic acid, dimethyl acrylic acid, ethyl acrylic acid, vinyl acetic acid, allyl acetic acid. The preferred monomers of this group are acrylic acid, methacrylic acid their mixtures, as well as sodium, potassium or ammonium salts or their mixtures. The monomers of group b) are present in the monomer mixture to the extent of 20–85%-wt., preferably 25–60%-wt., and most preferably 30–60%-wt.

The monomers of group c) include those which—after copolymerization—release one or more hydroxyl groups, which are directly covalently bonded at the C—C-polymer chain, in a cleavage reaction, e.g. by acid hydrolysis or alkaline saponification of the polymer. Examples thereof are: vinyl acetate, vinyl propionate, acetic acid-methyl vinyl ester, methyl vinyl ether, ethylene glycol monovinyl ether, vinylidene carbonate. The monomers of group c) are present in the monomer mixture to the extent of 1–50%-wt., preferably 1–30%-wt., more preferably 1–20%-wt., and most preferably 1–15%-wt.

Suitable monomers of groups d) include, for example, sulfonic groups and sulfate groups-containing monomers, such as meth (allyl sulfonic acid), vinyl sulfonic acid, styrene sulfonic acid, acrylamidomethylpropane sulfonic acid, as well as hydroxyethyl(meth)acrylate sulfates, (meth)allyl alcohol sulfates as well as their alkali and/or ammonium salts. Particularly preferred are (meth)allyl sulfonic acid and (meth)allyl alcohol sulfates. The monomers of group d) are present in the monomer mixture to the extent of 0.1–40%-wt., preferably 0.5–25%-wt., more preferably 1–10%-wt., and most preferably 1–5%-wt.

The monomers of group e) are merely and optionally used to modify the polymers. Suitable monomers of group e), which may optionally be used in the copolymerization, include, for example, doubly ethylenically unsaturated, non-conjugated compounds which normally act as cross-linking agents and increase the molecular weights of the polymers; these are to be used in limited amounts. In addition, the polymers may be modified by those monomers of groups e) which change the solubility behavior or cause a partially surfactant-like or hydrophobic character, such as N-alkyl acrylamides, esters of alkoxylated $C_{1-18}$-alcohols, or polyalkylene glycol ester of (meth)acrylic acid, and polyalkylene glycol ether of (meth)allyl alcohol, which may optionally be capped at the end. The monomers of group e) are optionally present in the monomer mixture by up to 10%-wt.

The copolymers are manufactured in aqueous solution at 40–180° C. in the presence of polymerization initiators forming radicals under the polymerization conditions, e.g., inorganic and organic peroxides, persulfates, azo compounds, and so-called redox catalysts. Suitable polymerization initiators include, for example, acetylcyclohexane sulfonylperoxide, diacetylperoxidicarbonate, dicyclohexylperoxidicarbonate, di-2-ethylhexyl peroxidicarbonate, tert-butyl perneodecanoate, 2,2'-azobis(4-methoxy-2,4-dimethylvaleronitrile), 2,2'-azobis(2-methyl-N-phenylpropionamidine)dihydrochloride, 2,2'-azobis-(2-methylpropionamidine)dihydrochloride, tert-butyl perpivalate, dioctanoyl peroxide, dilauroyl peroxide, 2,2'-azobis-(2,4-dimethylvaleronitrile), dibenzoyl peroxide, tert-butylper-2-ethyl-hexanoate, tert-butyl permaleinate, 2,2'-azobis-(isobutyronitrile), dimethyl-2,2'-azobis isobutyrate, sodium persulfate, potassium persulfate, ammonium persulfate, bis-(tert-butyl peroxide)-cyclohexane, tert-butyl peroxiisopropyl carbonate, tert-butyl peracetate, hydrogen peroxide, 2,2'-bis-(tert-butyl peroxi)-butane, dicumyl peroxide, di-tert-butyl peroxide, di-tert-amyl peroxide, pinane hydroperoxide, p-methane hydroperoxide, cumol hydroperoxide, and tert-butyl hydroperoxide. The initiators are adapted to the chosen polymerization temperature in accordance with their half-life and can be used alone or in admixture with one another. 0.01 to 20, preferably 0.05 to 10%-wt. of a polymerization initiator or of a mixture of several polymerization initiators are used, relative to the monomers used in the polymerization. As a matter of fact, redox-coinitiators can also be used in the copolymerization, for example, benzoin, dimethylaniline, ascorbic acid, as well as organically soluble complexes of heavy metals, such as copper, cobalt, iron, manganese, nickel, and chromium. The reducing component of redox catalysts may be formed, for example, by compounds such as sodium sulfite, sodium bisulfite, sodium formaldehydesulfoxylate, and hydrazine. Using redox-coinitiators makes it possible to carry out the polymerization at a lower temperature. The normally used redox-coinitiator quantities amount to about 0.01 to 5% in case of reducing compounds, and 0.1 to 100 ppm, preferably 0.5–10 ppm in case of heavy metals. If the polymerization of the monomer mixture is started at the lower limit of the suitable temperature range for polymerization and then finished at a higher temperature, it is advisable to use at least two different initiators decomposing at different temperatures, so that a sufficient concentration of radicals is available in each temperature interval.

Since the exclusive use of persulfate usually results in broad molecular weight distributions and a low residual monomer content, and the exclusive use of peroxides results in narrower molecular weight distributions and a high residual monomer content, it is sometimes advantageous to use as redox catalyst a combination of peroxide and/or persulfate, reducing agent and heavy metal. The copolymerization may also be carried out by the action of ultraviolet radiation in the presence of photoinitiators or photosensitizers. For example, these are compounds such as benzoin and benzoin ether, α-methylbenzoin or α-phenylbenzoin. So-called triplett-photosensitizers such as benzyl diketals may also be used. If the molecular weight must be controlled, polymerization regulators are used. Suitable regulators include mercapto compounds, aldehydes, heavy metal salts. If polymerization is carried out in the presence of regulators, these are used in amounts ranging from 0.005 to 20%-wt., relative to the monomers. The molecular weight may also be controlled by the choice of the polymerization reactor material; for example, the use of steel as reactor material results in lower molecular weights than the use of glass or enamel. Moreover, the molecular weight may also be controlled by the initiator amount. For example, an increase of the peroxide content in a peroxide/persulfate-initiator mixture may lower the mean molecular weight of the polymer. Particularly preferable is a process alternative wherein a further addition of peroxide, in particular hydrogen peroxide, is effected after the end of initiator dosage, with the proviso that the molecular weights of the polymer according to the present invention are lowered.

The polymerization is effected in conventional polymerization vessels at temperatures of 40–180° C., optionally under pressure if boiling temperatures of the reactants are exceeded. A preferred polymerization temperature range amounts to about 60–120° C. Operations are carried out in an inert gas atmosphere, if necessary created by injecting nitrogen, under the exclusion of atmospheric oxygen. The monomer components are prepared either as a whole in aqueous solution, or they are polymerized by adding the initiator system. According to a preferred embodiment they are metered into the polymerization reactor over a period of 1–10 hours, preferably 2–8 hours.

According to an embodiment of the present invention, monomer a) is prepared and monomers b) to e) are metered thereto, either in admixture or separately. According to a preferred embodiment, monomers a) and d) are prepared jointly, and the remaining monomers are then dosed thereto.

The initiator system is added in parallel with the monomers, and after termination of the monomer dosage the addition thereof is preferably continued for a while to complete the monomer reaction. It has proved advantageous for the initial polymerization course to prepare a small portion of the initiator or initiator mixture. For the purpose of obtaining copolymers having a low residual content of maleic acid and in order to suppress a premature saponification of monomers of group c), the employed acid monomers are neutralized, at least partially. This may be effected by neutralizing or partially neutralizing the prepared monomers according to a) and optionally d), or by completely or partially neutralizing the monomers according to b) and optionally e) which are to be dosed. However, in this connection it should be avoided to neutralize or partially neutralize the carboxylic acid-containing monomers during polymerization by dosing lyes into the reactor with simultaneous dosage of vinyl esters; otherwise premature saponification of the monomers under formation of actetaldehyde and brown-colored reaction products will result. As an alternative it is also possible to prepare the monomers according to a) and optionally d) in a mainly neutralized form, and to meter the monomers to be dosed substantially in their acid form. The first object of these measures is to avoid premature hydrolysis of the monomers according to c), and the second one is to maintain a reasonable polymerization rate.

With respect to using the monomers according to c) phase separations because of miscibility gaps may take place in certain mixing ratios with water or in mixtures with the partially neutralized other monomers, in particular when larger portions of monomer c) are present. This may result in problems as to monomer dosage and polymerization course, or in an undesired hydrolysis of monomers c). Such problems may be avoided by using surface-active compounds; these are mainly used in the form of anionic and nonionic detergents or their mixtures. The polymerization in the presence of the surfactants simultaneously reduces the residual monomer content and improves the dispersive property of the polymers.

The anionic detergents include sodium alkyl benzene sulfonates, alkylsulfonates, fatty alcohol sulfates, and fatty alcohol polyglycol sulfates. In particular the following are to be mentioned: $C_8$–$C_{12}$-alkyl benzene sulfonates, $C_{12-16}$-alkylsulfonates, such as sodium dodecane sulfonate, $C_{12-16}$-alkyl sulfates, such as Na-lauryl sulfate, $C_{12-16}$-alkyl sulfonsuccinates, and sulfated ethoxylated $C_{12-16}$-alkanols. Additionally suitable are sulfated alkanolamine soaps, α-ester sulfonates, fatty acid monoglycerides, or reaction products of 1 to 4 moles of ethylene oxide with primary or secondary fatty alcohols or alkylphenols. Moreover, carboxymethylated reaction products of 3 to 20 moles of ethylene oxide with $C_{12-16}$-fatty alcohols or $C_{8-12}$-mono- or dialkylphenols as well as the phosphorus partial esters of ethoxylated $C_{12-16}$-fatty alcohols are also well suited.

Suitable for the use as nonionic, low-molecular surfactants are mainly water-soluble addition products of 3 to 40 moles of ethylene oxide to 1 mole of fatty alcohol, alkylphenol, fatty acid, fatty acid amide, alkane sulfonamide, or sorbitan fatty acid ester with HLB values of 8 to 18. Particularly suitable are the addition products of 5 to 16 moles of ethylene oxide to coconut or tallow fatty alcohols, to oleyl alcohol, to synthetic alcohols with 8 to 16 carbon atoms, as well as to mono- or dialkylphenols having 6 to 14 carbon atoms in alkyl groups.

The ethoxylation products may in addition optionally comprise up to 90%-wt. of propylene oxide, relative to the total alkylene oxide content. The addition products, which comprise ethylene and propylene oxide incorporated by condensation, may optionally be modified by butylene oxide in amounts of up to 50%-wt., relative to the total alkylene oxide content, the butylene oxide being incorporated by condensation.

The well suited nonionic detergents further include alkyl polyglucosides modified with $C_{4-18}$-alkyl groups and having an oligomerization degree of 1 to 10 glucose units, and water-soluble alkoxylation products obtainable by reacting these alkyl polyglucosides with ethylene oxide.

Suitable polymeric, nonionic, surface-active compounds include water-soluble cellulose or starch derivatives obtainable by methylation, alkoxylation with ethylene or propylene oxide, and by carboxymethylation, such as methylcellulose, hydroxyethyl- or hydroxypropyl cellulose, or carboxymethylcellulose.

Additionally suitable are partially saponified polyvinyl acetates having a saponification degree of 50–95% and graft polymers of vinyl acetate on polyethylene glycol.

The surface-active compounds are mostly added in amounts of 0.1 to 5%-wt., in particular 0.5 to 2%-wt., relative to the sum of monomers. During polymerization they are added to the prepared monomers, or mixed with the other components, or dosed into the reactor separately.

Copolymers manufactured by using maleic acid usually have a residual monomer content substantially consisting of free maleic acid, in addition to small amounts of fumaric acid. For example, Comparative Example 2 concerning a polymer according to DE 43 00 772 gives a residual maleic acid content of 2530 ppm and for fumaric acid of 300 ppm. Most surprisingly, using (meth)allyl sulfonate in the monomer mixtures according to the invention results in polymers whose ratio of maleic acid to fumaric acid is clearly in favor of fumaric acid. This is extremely advantageous since maleic acid should be avoided from the ecotoxicologic point of view. For example, the $LD_{50}$-values (rat, oral) of maleic acid amount to 708 mg/kg and those of fumaric acid to 10,700 mg/kg.

As soon as the polymerization is terminated, low-boiling components, for example residual monomers, or their hydrolysis products are distilled off if necessary, optionally under vacuum. It is frequently advantageous to carry out this distillation step already during polymerization, for example, to remove low-boiling or polymerization-impairing components.

Reconcentration of the aqueous polymer solutions may also be carried out with the distillation. Polymer solutions concentrated in this manner have a lower viscosity than polymers polymerized with a higher concentration from the start. Low-viscous polymers having an increased concentration are also obtained by substituting in the polymerization batch a portion of the aqueous phase for dissolving the monomer batch by an already finished polymer solution.

The hydrolysis or saponification of the monomers according to c) is carried out in acid or basic medium, pH values of less than 6.5 and more than 10 being preferred. Depending on the monomer type, saponification is carried out at 60–130° C. The duration of saponification depends on the chosen pH-values and the temperatures, it ranges between 0.1 and 8 hours. The pH values required in the polymer solution to be saponified for saponification purposes may be adjusted by adding solid, liquid, dissolved, or gaseous inorganic and organic acids or bases. Examples thereof include: sulfuric acid, hydrochloric acid, sulfur dioxide, toluene-p-sulfonic acid, sodium hydroxide solution, and potassium hydroxide solution. The readily volatile reaction products formed during the saponification may be separated by distillation, optionally under vacuum. A preferred embodiment is the alkaline saponification carried out without prior distillation of residual monomers and hydrolysis products in the presence of peroxides, the still existing residual monomers and hydrolysis products being polymerized in situ or oxidized into harmless carboxylic acids. The degree of saponification of the saponifiable monomer units amounts to 1–100%, preferably 30–100%, and most preferably 60–100%. At the end the aqueous polymer may be set to the pH value required for the respective application. To this end, the known agents, such as lyes and bases, mineral acids, carboxylic acids and polycarboxylic acids are used.

Examples thereof include mineral acids and acid anhydrides, such as hydrochloric acid, sulfuric acid, phosphoric acid, sulfur dioxide, and sulfur trioxide; formic acid, acetic acid, citric acid, tartaric acid, toluene-p-sulfonic acid may be used as organic acids. Examples of lyes include sodium hydroxide solution, potassium hydroxide solution, ammonia or ammonium hydroxide, amines, alkanolamines, and hydroxylamines.

In principle, the polymerization may also be carried out as a suspension polymerization; the aqueous monomer phase is dispersed by using suspension stabilizers in an organic phase, for example consisting of cyclohexane, and is then polymerized and saponified in the form of this suspension. Subsequently, the water may be removed from the suspension by azeotropic distillation, and the solid polymer particles may easily be filtered off the organic phase and used after drying. Another possibility of manufacturing powdery polymers is to spray-dry the polymer solution according to the present invention. For example, washing powders may be obtained by means of spray drying directly from a common solution or suspension consisting of the polymer solutions according to the present invention and further detergent components.

Most surprisingly, it has been found that the polymer solutions according to the present invention have an improved alkali resistance if the content of monomer d) in the monomer mixture is below 10%-wt., and most preferably below 7%-wt. If the polymer solutions are set to alkaline pH-values, as is usual for example in the production of detergents, there are no changes, whereas polymers according to DE 43 00 772 A1 start to flake after a while. This improved alkali resistance particularly shows to advantage when the polymers are rendered alkaline some time before they are further processed.

The above-described polymers turn up in the molecular weight range of from 500 to 5,000,000, the low-molecular products having molecular weights of below 70,000 already being absolutely suitable for the use as cobuilders. It has become apparent in application technological examinations that the polymers according to the present invention in the molecular weight range of 20,000 and less develop an excellent action in detergents and cleaners, and have a good dispersive power and suspending capacity. In addition, they are almost completely removed in the sewage-sludge-elimination-test (OECD-standard 303 A). The biodegradability was determined by the standard according to the guideline OECD 302 B where the $CO_2$-amount resulting from the degradation is measured and according to the standardized composting-test according to ASTM D 5338/92 also measuring the biodegradation on the basis of the generating $CO_2$. The polymers meet the requirements for the use in detergents because they can easily be eliminated and degraded.

It has surprisingly been found that the monomers according to d), in particular methallyl sulfonic acid, can control the molecular weight so that the polymers according to the present invention, in addition to their excellent effectiveness, can also be produced with a low viscosity at a high active content. The polymers according to the present invention have a viscosity of about 500 mPas at active contents of 40%, whereas the polymers according to DE 43 00 772 have a viscosity of about 1,100 mPas with a comparable active content. A commercial copolymer based on maleic acid and acrylic acid and used in detergents has a viscosity of about 3600 mPas, the active content also amounting to 40%. The low viscosities of the polymers according to the present invention are generally advantageous when used, and in particular when incorporated, as a component in laundry detergent formulations.

For this reason the polymers according to the present invention are excellently suitable for detergent and cleaner formulations that are completely or partially manufactured by spray drying, or which are to be used in compaction processes with the lowest possible water content. The favorable ratio of low viscosity to high active content makes it possible to manufacture easy-to-handle slurries for an undisturbed spraying process, on the one hand, and on the other hand a simplified production, for example, of detergent compact granulates by means of extrusion becomes possible, wherein the active substance is to be incorporated into the mixture with the lowest possible water amount in order to form dry, free-flowing granules or to minimize a possible drying expenditure.

If the polymers are to be used in liquid detergents they may be modified with hydrophobic comonomers, e.g., the monomers of group e). The dissolution behavior of the polymers in the liquid phase of the liquid detergents can be adapted by this.

Accordingly, the subject matter of the present invention also relates to detergents and cleaners, in particular textile detergents, comprising the polymers according to the present invention. Preferably, the polymers are used in amounts of 0.5–30%-wt., particularly 2–25%-wt. It is further preferable that, in addition to the polymers, the agents comprise one or more ingredients of the group of alkaline inorganic salts and builder substances normally used in detergents and cleaning agents. The agents according to the present invention may be present in solid, granular, or liquid to pasty form and can be produced by known production methods, such as spray drying, mixing, granulating and/or extrusion processes. In this connection it is also possible to use a builder combination in the form of a compound as an admixture component to other granular components of the laundry detergents and cleaners.

Such builder combinations which also form a part of the present invention comprise the polymers according to the present invention and—according to a preferred embodiment—1–30%-wt. of the polymers according to the present invention and 50–70%-wt. of zeolite and/or crystalline layered silicates. Also preferable are builder combinations comprising 5–30%-wt. of sodium carbonate, 0–10%-wt. of amorphous silicates, 0–25%-wt. of organic polycarboxylic acid salts, and 0–5%-wt. of conventional (co)polymeric acrylates. Because of the excellent dispersing/suspending properties of the polymers according to the present invention aqueous suspensions of the above composition will have an excellent stability to sedimentation. Moreover, the builder combinations may additionally comprise liquid to waxy components, preferably surfactants.

Alkaline inorganic salts include water-soluble bicarbonates, carbonates, amorphous silicates, or mixtures of these; in particular alkali carbonate and alkali silicate are used. The alkali carbonate content of the agents may amount to 0 to about 20%-wt., the alkali silicate content of the agents in general amounts to 0 to about 10%-wt. It is preferred that sodium silicate and sodium carbonate be used.

Known builders normally used in laundry detergents and cleaners primarily are phosphates, zeolites, and layered silicates; zeolite and crystalline layered silicates being preferred. Suitable zeolites have an average particle size of less than 10 $\mu$m and preferably comprise 18–22%-wt. of bound water. Crystalline, layered silicates represent a substitute or partial substitute for phosphates and zeolites; in particular β- and δ-sodium disilicates $Na_2Si_2O_5 \cdot yH_2O$. The agents according to the present invention preferably comprise water-containing zeolite and/or crystalline layered silicates in amounts ranging from 10 to 65%-wt.

Suitable organic builders include, for example, polycarboxylic acids, such as citric acid, adipic acid, succinic acid, glutaric acid, tartaric acid, sugar acids, amino carboxylic acids, polyasparaginic acids, nitrilotriacetic acid, and mixtures of these.

They are preferably used in the form of salts, their content in the agents preferably amounts to 0–20%-wt.

In addition to the polymers according to the present invention the detergents and cleaning agents may also comprise known and usual homo- and copolymeric polycarboxylates based on (meth) acrylic acid and/or maleic acid, and optionally further monomer and graft components, as well as polyacetals originating from the reaction of dialdehydes with polyolcarboxylic acids. The portion of these polycarboxylates in the laundry detergents and cleaners according to the present invention shall not exceed 2%-wt.

In the production of detergents for dyed textiles so-called discoloration inhibitors must be added. These substances prevent transmission of dyestuff from heavily dyed textiles or textile parts to undyed or light-colored textiles or textile parts. The same applies to preventing the transmission of optical brightening agents. It is preferred that 0.1–5%-wt. of polymers or copolymers of vinylpyrrolidone, vinyl oxazolidone, vinyl imidazole, polyamine-N-oxides, optionally supported by cellulase, be used as discoloration inhibitors.

The laundry detergents and cleaners according to the present invention comprise as further usual ingredients in particular 10–40%-wt. of anionic, nonionic, amphoteric, zwitterionic, and/or cationic surfactants.

Suitable anionic detergents include those of the type sulfonates and sulfates, for example, alkyl benzene sulfonates, olefinsulfonates, alk(ene)yl sulfates, sulfonsuccinic acid esters, ethoxylated fatty alcohol sulfates, α-sulfo fatty acids or their esters, and sulfated fatty acid glycerol esters or their mixtures. Anionic detergents may also be used in the form of fatty acid soaps.

Ethoxylated $C_9$–$C_{18}$-alcohols, alkyl glucosides and alkoxylated fatty acid alkyl esters are preferably used as nonionic detergents; additionally surfactants of the type amine oxides, alkanolamine soaps, and polyhydroxy fatty acid amides. The use of nonionic cellulose ethers from the group of methylhydroxypropyl celluloses having a portion of 15–35%-wt. of methoxy groups and 1–15%-wt. of hydroxypropyl groups, has proved successful in eliminating fat and oil-containing soil on textiles.

The laundry detergents and cleaners according to the present invention may additionally comprise 15–45%-wt. of further conventional ingredients, such as anti-redeposition agents (soil carriers), foam inhibitors, bleachers and bleaching activators, optical brighteners, enzymes, fabric softeners, dyes and aromatic principles, as well as neutral salts.

Foam inhibitors are generally used in amounts of 0–8%-wt. Soaps, silicone oil or hydrophobic silica acids are normally used. In case of defoamers which are not surface active, amounts in the range of 0–3.5%-wt. are generally sufficient because of the stronger effect as compared to soaps.

Optical brighteners, also called (fluorescent) whitening agents, absorb the UV portion of the sunlight in the wavelength range of about 350 nm, which is invisible for human eyes, and emit blue fluorescence of about 440 nm (500 nm). The fluorescent radiation, for example of the whitening agents absorbed on the textile fibers during washing, adds to the reflected visible light; so a probable yellow hue of a white fabric, which sometimes occurs after several uses and cleaning, is not only regenerated to white again but also an overall intensified white color is achieved. Stilbene derivatives are particularly suitable for the use as brighteners; but also coumarin- and quinolone-(carbostyril)- and 1,3-diphenylpyrazoline structures, naphthalene dicarboxylic acid and cinnamic acid derivatives, as well as combinations of benzoxazole or benzimidazole structures with conjugated systems can be used. Optical brighteners are used in the range of 0 to 5%-wt., preferably in the range of 0.1 to 0.3%-wt.

Enzymes are nearly indispensable ingredients in all-purpose laundry detergents and in many other formulations for washing and cleaning. For example, pancreatine (trypsin), proteases, amylases, cellulases, and lipases are used. Their range of application amounts to between 0 and 3%-wt., preferably between 0.3 and 1.3%-wt.

Laundry Detergents (W1 to W10) with the following composition were manufactured with the polymers according to the present invention, the quantity indications relate to percent by weight:

The formulations according to the present invention may be used as textile laundry detergents in domestic and industrial cleaning processes. The polymers according to the present invention contained in the formulations have an excellent binding capacity for multivalent metal ions and a high dispersive power. For this reason the use of water-softening silicates, such as zeolite or crystalline sodium layered silicates can be dispensed with to some extent. The laundry detergents according to the present invention result in good dirt removal and soil dispersion and cause only slight incrustations during the washing of textiles with hard water. The laundry detergents may be strong-foaming formulations, such as those used in hand-washing, or they may be foam-regulating surfactant systems used in laundry washing.

Another subject matter of the present invention relates to hard-surface cleaners, and in particular phosphate-free cleaning agents for dishwashing machines, wherein the polymers according to the present invention are used to advantage because of their complexing and dispersing properties.

Typical machine dishwashing detergents have a high alkalinity and substantially consist of ingredients of the type alkali triphosphate (15–30%-wt.), alkali metasilicate (20–60%-wt.), waterglass (0–5%-wt.), alkali carbonate (5–30%-wt.), nonfoaming surfactants (0.5–2%-wt.), bleachers (4–7%-wt.), and chlorine separators (0–5%-wt.).

New ecological cleaners are phosphate-free and low-alkaline and are based on citrates, polycarboxylates, and carbonates, they try to dispense with chlorine-eliminating substances.

The formulations according to the present invention for phosphate-free machine dishwashing detergents comprise

| Base materials | W1 | W2 | W3 | W4 | W5 | W6 | W7 | W8 | W9 | W10 |
|---|---|---|---|---|---|---|---|---|---|---|
| $C_{9-13}$-alkyl benzene sulfonate-Na | 9 | | 2 | | 6 | 6 | | | 5 | 9 |
| $C_{16-18}$-tallow fatty alcohol sulfate | | 4 | | | 7 | 2 | 2 | 7.5 | | |
| $C_{12-18}$-fatty alcohol sulfate-Na | | | | | | | 2 | | | |
| $C_{12-18}$-fatty alcohol with 5 EO | 4.3 | 18 | 15 | 14 | 4.5 | 4.5 | 2.5 | | | |
| $C_{12-14}$-fatty alcohol with 7 EO | | | | | | | | 5 | 7 | |
| $C_{16-18}$-fatty alcohol with 14 EO | | | | | | | 2 | | | |
| tallow fatty alcohol with 5 EO | 1.8 | 2.5 | 2 | 2 | 2 | 2 | | | | |
| glycerol with 19 EO | | | | | | | | | | 3 |
| $C_{12-18}$-fatty acid soap-Na | 0.8 | 4 | 3 | 4 | 1 | 1 | | 5 | 5 | 2 |
| tripolyphosphate | | | | 10 | 5 | | | | | |
| zeolite NaA | 23.5 | 30 | | 25 | | 5 | 38 | | | 35 |
| cryst. layered silicate | | | 35 | 8 | | | | | | |
| bentonite | | | | 5 | | | | | | |
| amorph. sod. disilicate | 3 | 3 | 7 | 3 | 3 | 3 | 5.5 | | | 3 |
| citrate | | 8 | 16 | | | | | | | |
| sodium carbonate | 12.6 | 8 | | 11 | 5 | 5 | 3 | 25 | 30 | 9 |
| sodium bicarbonate | | | | | | | | 25 | | |
| perborate-monohydrate | 16 | | | 5 | 16 | 16 | | | | |
| perborate-tetrahydrate | | | | | | | 25 | | 15 | |
| tetraacetylethylenediamine | 5.5 | | | | 5.5 | 5.5 | 2 | | | |
| carboxymethylcellulose | 0.25 | | | | | | | 1.5 | | |
| polyvinyl pyrrolidone | | | | 0.8 | | | | | | |
| enzyme granulate | 1 | | | 0.6 | 1 | 1 | 1 | | | 0.45 |
| defoamer granulate | 0.2 | | | | 0.2 | 0.2 | 0.2 | | | |
| optical brightener | 0.2 | | | | 0.2 | 0.2 | 0.2 | | | |
| water, salts, perfume | rest | rest | rest | rest | rest | rest | rest | rest | rest | rest |
| polymer acc. to invention of Exam. 2 | 5.5 | 4 | 3 | 3.5 | 5 | 5 | 2 | 20 | 15 | 3 |

1–60%-wt. of the polymers according to the present invention, 5–90%-wt. of alkali formers, 0–60%-wt. of dispersing and complexing agents, 0–10%-wt. of low-foaming surfactants, and 0–50%-wt. of further additives. Suitable alkali formers primarily include water-soluble alkali silicates, such as alkali metasilicates, alkali-disilicates, and crystalline alkali layered silicates. Moreover, alkaline reacting salts, such as alkali hydroxides, alkali carbonates, and alkali hydrogen carbonates also belong to the group of alkali formers. The quantity of these alkaligenous substances preferably amounts to between 5 and 70%-wt., most preferably between 5 and 55%-wt.

The formulations may also comprise dispersing and complexing agents. Suitable products include citrates, phosphonates, homo- and copolymers of acrylic acid, isoserine diacetic acid, ethylenediamine tetraacetic acid, and nitrilotriacetic acid, as well as the alkali salts of the above-mentioned compounds. If these compounds are used in the formulations, their quantity preferably amounts to between 5 and 50%-wt.; sodium citrate in concentrations of 10–40%-wt. being particularly preferred.

In addition, the formulations may also comprise low-foaming surfactants, preferably in amounts of 0.5–5%-wt. Particularly preferred are low-foaming, nonionic detergents, e.g., ethylene oxide(1–20 moles)-propylene oxide(1–20 moles)-addition products to 1 mole of aliphatic alcohols, carboxylic acids, fatty amines, carboxylic acid amides, and alkane sulfonamides having 10–20 carbon atoms, or compounds of the above substances which are capped at the end with alkyl groups. Moreover, $C_{8-22}$-alkyl polyglycosides and only partially water-soluble polyglycol ethers are used, or they are combined with the nonionic detergents. A maximum surfactant content of 2%-wt. is particularly preferred.

The formulations may also comprise further additives. Such additives are oxygen-based bleaching agents, e.g., perborates and percarbonates, and persalts of organic acids, such as perbenzoates; they are comprised in amounts of 0.5–20%-wt., preferably 5–15%-wt. Chlorine-separating bleaching agents are used in amounts of 0–5%-wt., if at all. The addition of bleacher stabilizing additives, e.g., magnesium salts and/or borates is advantageous.

Oxygen bleaching is either improved by using suitable bleaching activators, or it already starts at low washing temperatures. To this end, tetraacetylated diamines, e.g., TAED (tetraacetylethylenediamine), are preferably used, the quantity amounting to 0–10%-wt., particularly preferred are maximum quantities of 5%-wt.

To improve the removal of protein and starch-containing food particles the formulations may comprise enzymes of the type protease, amylase, lipase, and cellulase. Advantageous added amounts are in the range of between 0.1 and 5%-wt., a maximum quantity of 2%-wt. being preferred.

Perfumes and dyestuffs, defoamers, free-flow agents, silver protectants, adulterants and extenders, can easily be added to the dishwasher agents according to the present invention as further ingredients.

The dishwashing formulations according to the present invention may be liquid products, powdery types, and granulates, or products compressed into blocks or pellets.

Liquid formulations may be produced by mixing the components. Powdery products are mostly manufactured by mixing the powdery components and optional spraying the liquid components, or by spray drying an aqueous, liquid to paste-like batch of the starting components. The production of pellets is effected by mixing the raw materials first and/or by a preliminary treatment in mist blowers, and then these are compressed in pelletizing machines.

The polymers according to the present invention contained in the formulations have an excellent binding capacity for multivalent metal ions and a very good dispersing and soil-carrying capacity. For this reason they have an advantageous effect in the dishwashing formulations according to the present invention; i.e., they support dirt removal and soil dispersion and reduce depositions of hard water elements on the goods to be cleaned and on machine parts. Cleaners for the use in dishwashing machines (C1–C8) were produced with the polymers according to the present invention, they have the following composition (indications in %-wt.):

| Base materials | C1 | C2 | C3 | C4 | C5 | C6 | C7 | C8 |
|---|---|---|---|---|---|---|---|---|
| $C_{12-14}$-fatty alcohol with 4 EO | 2 | 2 | 2 | | | | | |
| $C_{12-18}$-fatty alcohol with 1EO2PO | | | | 0.9 | 0.9 | 2 | 1 | |
| $C_{12-14}$-coconut fatty alcohol-1PO–3EO | | | | | | | | 2 |
| octyl-1, 2PO, 6EO-butyl ether | | | | | | | | 2 |
| polym. acc. to invent., Ex. 2 | 10 | 8 | 10 | 10 | 5 | 8 | 5 | 15 |
| sodium citrate dihydrate | | 35 | | 30 | 40 | 30 | 35 | 15 |
| sodium metasilicate pentahydrate | 50 | | 50 | | | | | |
| sodium disilicate | | 20 | | | | 10 | | |
| sodium hydroxide | 10 | | | | | | | |
| sodium carbonate | 28 | 20 | 5 | 13 | 6 | 40 | 5 | 10 |
| sodium hydrogencarbonate | | | | 35.5 | 30.1 | | 38 | 10 |
| sodium perborate monohydrate | | 10 | | 5 | | 7 | 10 | 3 |
| sodium perborate | | | | | 12 | | | |
| tetraacetylethylenediamine | | 3 | | 2 | 3 | 2 | 4 | 1 |
| enzyme (amylase/protease = 1:1) | | 2 | | 3 | 2 | 1 | 2 | 1 |
| sodium sulfate | | | 33 | | | | | |
| perfume oil | | | | 0.6 | 0.6 | | | 1 |
| manganese(II) sulfate | | | | | 0.4 | | | |
| ad 100%-wt. water | | | | | | | | |

The polymers according to the present invention can also advantageously be used as auxiliary agents in the finishing of textiles or textile materials. For example in the boiling off or kier scouring of cotton, here they bind hardness constituents and disperse cotton accompanying substances or impurities so that their redeposition prevented, and they support the action of surfactants. The polymers according to the present invention are used as stabilizers in peroxide bleaching; when stabilizing silicates are additionally used, they prevent silicate depositions.

The polymers according to the present invention may also be used as auxiliary agents in continuous and discontinuous washing and dyeing liquors; here the unfixed dye is removed and good fastness to washing, water and crocking or rubbing is achieved. In the case of polyester fibers, the dispersive action of the polymers causes the separation of dissolving oligomeric polyester components which disturb the dyeing process.

In the case of cellulose dyeing, the polymers according to the present invention promote the solubility of reactive and direct dyestuffs, and they result in an improved levelness of the dyestuff on the fibers, in particular when large amounts of salts are present in the liquor. In vat dyeing they can advantageously be used as dyestuff pasting agent or as dispersant in the pigmentation bath. In sulfur dyeing they support the dyestuff dispersion and prevent bronzing.

In the dyeing of synthetic fibers the polymers according to the present invention prevent the formation of agglomerates of disperse dyestuffs, thus avoiding deposits in the cones.

When vat dyes and prints are washed-off, the polymers according to the present invention bind unfixed dyestuff components, and redeposition is reduced to a considerable extent. Due to the increased dyestuff diffusion to the washing liquor, the polymers provide for an optimum removal of unfixed dyes with a saving in water and energy.

For this reason, the products according to the present invention represent an effective substitute for polyphosphates in the after-treatment of naphthol dyeings; when reactive prints are washed-off, calcium alginate is prevented from precipitating.

The dispersing and complexing action of the polymers according to the present invention takes effect without remobilizing heavy metal compounds, both from dyestuff chromophores (reactive and metal complex dyes) and from deposits of a natural or industrial origin which are water-insoluble as such.

In comparison with conventional auxiliary agents, such as polyacrylates, the required quantities can be reduced in practice by about three to five times.

The polymers according to the present invention may be used in combination with surfactants, in particular anionic detergents, in non-neutralized form (acidified) in combination with complexing organic acids, such as citric acid, lactic acid, gluconic acid, and phosphonic acids and surfactants, in particular anionic detergents.

For instance, such combinations are advantageously used instead of the conventional multi-stage pretreatment carried out in separate baths; for example, in such a manner that the pretreatment is carried out in only one adjustable treatment bath under addition of the polymers according to the present invention to treat highly-loaded cotton or linters, this normally includes the steps of acid extraction, chlorite bleach, boiling and $H_2O_2$-bleach.

This method according to the present invention can also be used in continuous processes. Said methods prevent the formation of undesired organic halogen compounds involving the respective environmental impact.

The polymers are suitable additives to desize fiber sizes which are sensitive to hardness of water, e.g. polyester sizes.

The polymers according to the present invention exhibit a good to excellent activity as auxiliary agents in the manufacture of leather when they are used, among others, in steeping, liming, washing processes following liming, and in deliming, in particular in $CO_2$-deliming.

In chrome tanning they cause an increased chromium up-take through the leather, polymers according to the present invention having mean molecular weights of below 5,000 g/mol being particularly preferred. In retanning the polymers according to the present invention give fullness and softness to the leather; particularly preferred are copolymers having portions of 0.5–10%-wt. of the monomers according to e) which have a hydrophobing effect or render a surfactant-like character.

Because of their dispersing and heavy-metal-complexing but not remobilizing properties the polymers according to the present invention can advantageously also be used as auxiliary agent in papermaking. For instance, in the production of dispersions of pigments and fillers, such as kaolin, calcium carbonate, satin white, talcum, titanium dioxide, aluminum hydroxide, and barium sulfate, as well as in the production of coating colors. Thereby filler and pigment slurries as well as coating colors having a high solids content and a high storage stability are obtained.

The polymers according to the present invention may be used in combination with other auxiliary agents.

The high-molecular polymers are suitable for other purposes, e.g., as thickeners, auxiliaries in papermaking, auxiliaries in the water and waste-water treatment, or as additives for drilling fluids.

The production and properties of the polymers according to the present invention will be illustrated in greater detail in the following examples. Application-specific examinations demonstrate the high effectiveness of the polymers in the inhibition of water hardness, the excellent $Ca^{2+}/Fe^{3+}$ binding capacity or the $CaCO_3$-dispersing power, the complexing of heavy metals at different temperatures and pH-values, as well as the very good soil-carrying capacity in washing processes (hydrophilic suspension capacity). Moreover, in addition to the pigment dispersion, their application in the leather manufacture is exemplary shown in retanning, and in textile-chemical finishing it is exemplary shown in the stabilization of bleaching baths, in dyeing and dispersion.

EXAMPLES OF PREPARATION

Example 1

In a glass polymerization reactor equipped with heating bath, precision glass stirrer, metering device for liquid substances, and reflux condenser, 114.8 g of maleic anhydride, 2.97 g of sodium methallyl sulfonate, and 12.6 mg of ammonium iron(II) sulfate are placed in 283.2 g of demineralized water. 168.5 g of [50%-wt.] sodium hydroxide solution is added to this mixture which is then heated to 90° C. until a clear solution results. Starting at the same time, two solutions are dosed into this preparation over a period of 4 hours. Solution I consists of 146.5 g of acrylic acid, 35.4 g of vinyl acetate, 65.1 g of [50%-wt.] sodium hydroxide solution, and 45.0 g of demineralized water. Solution II consists of 50.55 g of [35%-wt.] hydrogen peroxide, 4.0 g of sodium peroxodisulfate, and 35.0 g of water. After termination of dosage, stirring is continued at 90° C. for another 60 minutes; 31 g aqueous phase is then distilled off the batch via a distilling connection tube. Cooling to 40° C., setting to pH 10 using 54.8 g of [50%-wt.] sodium hydroxide solution, refluxing for 3 hours. The clear, cooled, slightly yellow solution is set to pH 6.8 by means of 46.5 g of conc. hydrochloric acid. The final product has a solid content of 39.0%, the molecular weight amounts to about Mw=12,000 g/mol.

Example 2

As against Example 1, the quantities prepared or metered into the reactor are changed as follows:

Charge: 229.6 g of maleic anhydride, 450.6 g of water, 337.0 g of [50%-wt.] sodium hydroxide solution, 12.2 g of sodium methallyl sulfonate, and 25.2 mg of ammonium iron(II) sulfate. Feed solution I: 293.0 g of acrylic acid, 90 g of water, 130.2 g of [50%-wt.] sodium hydroxide solution, and 70.8 g of vinyl acetate. Feed solution II: 8.0 g of sodium peroxodisulfate, 135.2 g of [35%-wt.] hydrogen peroxide in 81.8 g of water. After termination of the dosage stirring is continued for 30 minutes, then 56.1 g of liquid is distilled off. The saponified and neutralized polymer with a solid content of 43.1% has a viscosity of 540 mPa.s. The molecular weight is in the range of Mw=11,000 g/mol.

Example 3

Modifying Example 1, the following quantities are prepared or metered:

Charge: 114.8 g of maleic anhydride, 283.2 g of water, 168.5 g of [50%-wt.] sodium hydroxide solution, 8.91 g of sodium methallyl sulfonate, and 12.6 mg of ammonium iron(II) sulfate. Feed solution I: 146.5 g of acrylic acid, 45.0 g of water, 65.1 g of [50%-wt.] sodium hydroxide solution, and 35.4 g of vinyl acetate. Feed solution II: 50.6 g of

[35%-wt.] hydrogen peroxide, 4.0 g of sodium peroxodisulfate in 35.0 g of water. After termination of the dosage and 30-minutes stirring time, 36.1 g aqueous phase is distilled off via a distilling connection tube and the still weakly acidic polymer solution (pH 5.2) is refluxed for 6 hours. After neutralization a polymer solution is obtained which has a solid content of 41.6% and comprises 0.10% fumaric acid in addition to 0.03% of maleic acid. The molecular weight amounts to Mw=10,200 g/mol.

Example 4

Example 2 is repeated with the following changes:

Charge: 229.6 g of maleic anhydride, 31.3 g of sodium methallyl sulfonate, 337.0 g of [50%-wt.] sodium hydroxide solution, and 25.2 mg of ammonium iron(II) sulfate in 450.6 g demineralized water. Feed solution I: 293.0 g of acrylic acid, 70.8 g of vinyl acetate, 130.2 g of [50%-wt.] sodium hydroxide solution, and 90.0 g of water. Feed solution II: 8.0 g of sodium peroxodisulfate, 135.2 g of [35%-wt.] hydrogen peroxide and 81.8 g of water. After termination of the dosage and a stirring time of 30 minutes, 1 g of vinyl acetate and 55 g of aqueous phase is distilled off the batch. The saponified and neutralized polymer has a solid content of 42.4% and a viscosity of 430 mPa.s.

Example 5

The manufacture of Example 5 corresponds to that of Example 2. The amounts prepared or dosed in the reactor change as follows:

Charge: 229.6 g of maleic anhydride, 66.0 g of sodium methallyl sulfonate, 337.0 g of [50%-wt.] sodium hydroxide solution, and 25.2 mg of ammonium iron(II) sulfate in 490.0 g water. Feed solution I: 293.0 g of acrylic acid, 70.8 g of vinyl acetate, 130.2 g of [50%-wt.] sodium hydroxide solution, and 90.0 g of water. Feed solution II: 8.0 g of sodium peroxodisulfate, 135.2 g of [35%-wt.] hydrogen peroxide and 81.8 g of water. Once the dosage is terminated, stirring is continued at 90° C. for another 30 minutes, and 52.9 g aqueous phase is distilled off via a distilling connection tube. The clear solution of the saponified and neutralized polymer has a solid content of 44.1% and a molecular weight of Mw=10,000 g/mol.

Example 6

In a polymerization test according to the specification for preparation of Example 2, the following quantities are prepared or metered:

Charge: 91.8 g of maleic anhydride, 59.3 g of sodium methallyl sulfonate, 134.8 g of [50%-wt.] sodium hydroxide solution, and 12.6 mg of ammonium iron(II) sulfate in 225.3 g of water. Feed solution I: 117.2 g of acrylic acid, 28.3 g of vinyl acetate, 52.1 g of [50%-wt.] sodium hydroxide solution, and 45.0 g of water. Feed solution II: 4.0 g of sodium peroxodisulfate, 67.6 g of [35%-wt.] hydrogen peroxide and 40.9 g of water. After termination of the dosage and stirring at 90° C. for another 30 minutes, 30.5 g aqueous phase is distilled off. The saponified and neutralized polymer has a solid content of 41.2% and a molecular weight of Mw=5,500 g/mol.

Example 7

The production of Example 7 is effected in correspondence with Example 2. The amounts prepared and dosed into the reactor are changed as follows:

Charge: 229.6 g of maleic anhydride, 11.24 g of sodium methallyl sulfonate, 337.0 g of [50%-wt.] sodium hydroxide solution, and 25.2 g of ammonium iron(II) sulfate and 460.0 g of water. Feed solution I: 293.0 g of acrylic acid, 27.6 g of vinyl acetate, 130.2 g of [50%-wt.] sodium hydroxide solution, and 90.0 g of water. Feed solution II: 8.0 g of sodium peroxodisulfate, 135.2 g of [35%-wt.] hydrogen peroxide, and 81.8 g of water. Following the dosage and a stirring time of 30 minutes, 49.8 g aqueous phase is distilled off the batch. The saponified and neutralized polymer solution has a solid content of 37.1%, the mean molecular weight amounts to Mw=6,500 g/mol.

Example 8

Except for 29.0 g of sodium methallyl sulfonate the performance of this test corresponds to that of Example 7. The clear polymer solution has a solids content of 41.2%, a viscosity of 310 mPa.s., and a molecular weight of Mw=6,000 g/mol.

Example 9

The production of Example 9 corresponds to that of Example 2. The amounts prepared or dosed into the reactor are changed as follows:

Charge: 109.8 g of maleic anhydride, 29.7 g of sodium methallyl sulfonate, 161.1 g of [50%-wt.] sodium hydroxide solution, and 12.6 g of ammonium iron(II) sulfate, and 200.0 g of water. Feed solution I: 142.4 g of acrylic acid, 14.8 g of vinyl acetate, 63.2 g of [50%-wt.] sodium hydroxide solution, and 70.3 g of water. Feed solution II: 4.0 g of sodium peroxodisulfate, 67.6 g of [35%-wt.] hydrogen peroxide, and 40.9 g of water. The saponified and neutralized product is clear and has a solid content of 42.6% and a viscosity of 340 mP.s.

Example 10

Production is carried out according to Example 2 with the following changes with respect to quantity:

Charge: 44.5 g of maleic anhydride, 29.7 g of sodium methallyl sulfonate, 65.3 g of [50%-wt.] sodium hydroxide solution, and 12.6 g of ammonium iron(II) sulfate, and 170.3 g of water. Feed solution I: 207.7 g of acrylic acid, 14.8 g of vinyl acetate, 92.2 g of [50%-wt.] sodium hydroxide solution, and 100.0 g of water. Feed solution II: 4.0 g of sodium peroxodisulfate, 67.6 g of [35%-wt.] hydrogen peroxide, and 40.9 g of water. Following dosage and stirring for 30 minutes, 30.0 g aqueous phase is distilled off the batch. The saponified and neutralized product has a solid content of 41.5% and a viscosity of 860 mPa.s.

Example 11

Production method of Example 11 as in Example 2. The amounts prepared or dosed into the reactor are changed as follows:

Charge: 44.5 g of maleic anhydride, 118.68 g of sodium methallyl sulfonate, 65.3 g of [50%-wt.] sodium hydroxide solution, and 12.6 g of ammonium iron(II) sulfate in 240.0 g of water. Feed solution I: 118.68 g of acrylic acid, 14.8 g of vinyl acetate, 52.7 g of [50%-wt.] sodium hydroxide solution, and 30.0 g of water. Feed solution II: 4.0 g of sodium peroxodisulfate, 67.6 g of [35%-wt.] hydrogen peroxide, and 40.9 g of water. After termination of the dosage the batch is maintained at 90° C. for 30 minutes and then 28.2 g aqueous phase is distilled off. The saponified and neutralized product with a solid content of 43.8% has a viscosity of 95 mPa.s.

Example 12

In a polymerization experiment according to the formula of Example 2, the following quantities are prepared or dosed:

Charge: 104.4 g of maleic anhydride, 44.5 g of sodium methallyl sulfonate, 153.3 g of [50%-wt.] sodium hydroxide solution, and 12.6 g of ammonium iron(II) sulfate, and 230.0 g of water. Feed solution I: 132.9 g of acrylic acid, 14.8 g of vinyl acetate, 59.0 g of [50%-wt.] sodium hydroxide solution, and 40.0 g of water. Feed solution II: 4.0 g of sodium peroxodisulfate, 67.6 g of [35%-wt.] hydrogen peroxide, and 40.9 g of water. After termination of the dosage the batch is maintained at 90° C. for 30 minutes and then 30.3 g aqueous phase is distilled off. The saponified and neutralized polymer solution has a solid content of 42.4%.

Example 13

Production of Example 13 as in Example 2. The quantities prepared or dosed into the reactor are changed as follows:

Charge: 125.2 g of maleic anhydride, 5.93 g of sodium methallyl sulfonate, 183.8 g of [50%-wt.] sodium hydroxide solution, and 12.6 g of ammonium iron(II) sulfate and 220.0 g of water. Feed solution I: 159.6 g of acrylic acid, 5.9 g of vinyl acetate, 70.9 g of [50%-wt.] sodium hydroxide solution, and 60.0 g of water. Feed solution II: 4.0 g of sodium peroxodisulfate, 67.6 g of [35%-wt.] hydrogen peroxide and 40.9 g of water. After termination of the dosage the temperature is kept at 90° C. for 30 minutes, and then 36.4 g aqueous phase is distilled off the batch. The saponified, neutralized and clear product solution with a solid content of 42.3% has a viscosity of 660 mPa.s.

Example 14

Production is carried out as in Example 2 with the following changes in quantity:

Charge: 121.4 g of maleic anhydride, 14.8 g of sodium methallyl sulfonate, 178.1 g of [50%-wt.] sodium hydroxide solution, and 12.6 g of ammonium iron(II) sulfate and 225.0 g of water. Feed solution I: 154.6 g of acrylic acid, 5.9 g of vinyl acetate, 68.6 g of [50%-wt.] sodium hydroxide solution, and 45.0 g of water. Feed solution II: 4.0 g of sodium peroxodisulfate, 67.6 g of [35%-wt.] hydrogen peroxide and 40.9 g of water. The saponified, neutralized and clear product solution with a solid content of 42.1% has a viscosity of 360 mPa.s. The molecular weight amounts to Mw=8,000 g/mol.

Example 15

In a polymerization experiment according to the specification for preparation of Example 1, the following quantities are prepared or metered:

Charge: 114.8 g of maleic anhydride, 29.7 g of sodium methallyl sulfonate, 168.5 g of [50%-wt.] sodium hydroxide solution, and 12.6 g of ammonium iron(II) sulfate in 225.0 g of water. Feed solution I: 146.6 g of acrylic acid, 5.9 g of vinyl acetate, 65.1 g of [50%-wt.] sodium hydroxide solution, and 45.0 g of water. Feed solution II: 4.0 g of sodium peroxodisulfate, 67.6 g of [35%-wt.] hydrogen peroxide, and 40.9 g of water. Following dosage and subsequent stirring for 30 minutes, 29.6 g aqueous phase is distilled off the batch. The saponified clear polymer solution with a solid content of 42.0% has a viscosity of 330 mPa.s.

Example 16

The production of Example 16 is carried out as in Example 2. The quantities prepared in or metered into the reactor are changed as follows:

Charge: 114.8 g of maleic anhydride, 14.8 g of amidopropane sulfonic acid, 168.5 g of [50%-wt.] sodium hydroxide solution, and 12.6 g of ammonium iron(II) sulfate, and 225.0 g of water. Feed solution I: 146.6 g of acrylic acid, 35.4 g of vinyl acetate, 61.1 g of [50%-wt.] sodium hydroxide solution, and 45.0 g of water. Feed solution II: 4.0 g of sodium peroxodisulfate, 67.6 g of [35%-wt.] hydrogen peroxide and 40.9 g of water. After termination of the dosage stirring at 90° C. is continued for another 30 minutes, and then 30.7 g aqueous phase is distilled off the batch. The saponified and neutralized polymer with a solid content of 41.9% has a molecular weight of Mw=10,500 g/mol.

Example 17

In a polymerization experiment according to Example 2 the following quantities and components are prepared or metered:

Charge: 114.8 g of maleic anhydride, 168.5 g of [50%-wt.] sodium hydroxide solution, and 12.6 g of ammonium iron(II) sulfate and 225.3 g of water. Feed solution I: 146.6 g of acrylic acid, 35.4 g of vinyl acetate, 65.1 g of [50%-wt.] sodium hydroxide solution, 45.0 g of water, and 5.94 g of [35%-wt.] vinyl sulfonate. Feed solution II: 4.0 g of sodium peroxodisulfate, 67.6 g of [35%-wt.] hydrogen peroxide, and 40.9 g of water. After termination of the dosage stirring at 90° C. is continued for 30 minutes; 36.5 g aqueous phase is distilled off the batch. The saponified, neutralized polymer with a solid content of 41.0% has a molecular weight of Mw=10,300 g/mol.

Example 18

Manufacture of Example 18 is carried out as in Example 2. The quantities and components prepared or dosed into the reactor are changed as follows:

Charge: 114.8 g of maleic anhydride, 6.1 g of sodium methallyl sulfonate, 6.1 g of allyl alcohol-10-EO, 168.5 g of [50%-wt.] sodium hydroxide solution, and 225.3 g of water. Feed solution I: 146.5 g of acrylic acid, 35.4 g of vinyl acetate, 65.0 g of [50%-wt.] sodium hydroxide solution, and 45.0 g of water. Feed solution II: 4.0 g of sodium peroxodisulfate, 67.6 g of [35%-wt.] hydrogen peroxide and 40.9 g of water. Following dosage and subsequent stirring for 30 minutes, 28.4 g aqueous phase is distilled off the batch. The saponified, neutralized polymer solution with a solid content of 42.9% has a viscosity of 560 mPa.s.

Example 19

Example 2 is repeated with the exception that 1.8 g sodium dodecane sulfonate in the form of a 20% solution is placed in the reactor preparation. In comparison with Example 2, the clear polymer solution thus obtained has a clearly reduced surface tension.

Example 20

Polymerization is carried out as in Example 2, however, the added amounts of initiators are changed as follows: sodium persulfate 10.6 g and hydrogen peroxide [35%-wt.] 179.8 g. A low-viscous clear polymer is formed. The solid content amounts to 42.9%.

Comparative Example 1

This comparative example describes the production of a polymer of fumaric acid and sodium methallyl sulfonate according to the teaching of U.S. Pat. No. 3,879,288. A mixture of 200 g of sodium methallyl sulfonate and 110 g of fumaric acid in 250 ml of demineralized water is placed in a 1-liter polymerization reactor equipped with precision glass stirrer and internal thermometer. The charge is heated to 90° C., and 5 ml of [30%-wt.] hydrogen peroxide is added. After one hour 5 ml of [30%-wt.] hydrogen peroxide is added again and stirring at 90° C. continued for another two hours. A clear solution is obtained which has a dry substance content of 53.6% and comprises 0.8% of free fumaric acid and 7.4% of free sodium methallyl sulfonate. With respect to the sodium methallyl sulfonate used, this corresponds to a conversion of 79%. This example clearly shows that polymers manufactured according to U.S. Pat. No. 3,879,288 have a considerably higher content of residual monomers than the polymers according to the present invention.

Comparative Example 2

The second comparative example is a terpolymer of maleic acid, acrylic acid, and vinyl acetate; its production is described in German Patent DE 4300772, Example 1. 63.8 g of maleic anhydride, 260.0 g of demineralized water, 93.6 g of [50%-wt.] sodium hydroxide solution, and 6.3 mg of ammonium iron(II) sulfate are placed in a 2-l-glass-polymerization vessel and heated to 86° C. Within a period of 4 and 4.5 hours, two solutions are metered into the clear solution. Solution I (4 hours) is a mixture of 31.4 g of acrylic acid, 42.1 g of vinyl acetate, and 100 g of water. The second solution (4.5 hours) consists of 18.7 g of [35%-wt.] hydrogen peroxide and 100 g of water. At the end of the dosage of solution II, the internal temperature has risen to 92° C.; at this temperature stirring is continued for one hour, and 11 g aqueous phase and 5 g of vinyl acetate are withdrawn by means of a water separator. At 40° C. the batch is set to pH 10 by means of sodium hydroxide solution, refluxed for 60 minutes, and neutralized to pH 7 using hydrochloric acid. The mean molecular weight of the polymer amounts to Mw=22,000 g/mol. The residual monomer content is of the order of 2530 ppm of maleic acid, 300 ppm of fumaric acid, 370 ppm of acrylic acid, <10 ppm of vinyl acetate.

Examples Relating to Application Technology

Example 21

Calcium-Carbonate-Dispersive Capacity

An essential characteristic feature of cobuilders in detergents and cleaners is the capability of preventing slightly soluble precipitations of alkaline-earth or heavy metal salts which, for example, cause incrustations on clothes. To determine the calcium carbonate dispersive capacity (CCDC) [according to Richter Winkler in Tenside Surfactants Detergents 24 (1987) pp 213–216] the procedure was as follows:

1 g of product (dry substance) is dissolved in 100 ml of distd. water, and 10 ml of 10% sodium carbonate solution is added. A pH of 11 is set using sodium hydroxide solution, and titration is carried out with 0.25 ml of calcium acetate solution until a first permanent turbidity occurs. The CCDC is indicated in mg $CaCO_3$/g dry substance.

| Example No. | CCDC |
|---|---|
| 1 | 334 |
| 2 | 287 |
| 3 | 318 |
| 4 | 291 |
| 5 | 277 |
| 7 | 378 |
| Comparative Example 1 | 44 |
| Comparative Example 2 | 273 |
| Commercial Product (polymer based on maleic acid/acrylic acid-Na-salt) | 258 |

The calcium carbonate dispersion test shows that the polymers according to the present invention provide better $CaCO_3$-dispersive activity than the comparative products in the form of commercial products or those manufactured according to the teachings of U.S. Pat. No. 3,879,288 and DE 4300772 A1.

Example 22

Hampshire-Test 2 ml of 10% sodium carbonate solution is added to a solution of 1 g of product (dry substance) in 100 ml of water, then pH 11 is set using hydrochloric acid or sodium hydroxide solution. Titration with 0.25 mol of calcium acetate solution is carried out until a first permanent turbidity occurs. The indication is given in mg $CaCO_3$/g dry substance:

| Example No. | Hampshire |
|---|---|
| 1 | 563 |
| 2 | 525 |
| 3 | 540 |
| 4 | 566 |
| 5 | 588 |
| 6 | 646 |
| 7 | 547 |
| 8 | 601 |
| 9 | 616 |
| 10 | 689 |
| Comparative Example 1 | 89 |
| Comparative Example 2 | 478 |

The above Table shows that the polymers according to the present invention under the conditions of the Hampshire-Test have a high calcium binding capacity or a higher precipitation-preventing capacity than polymers obtained according to the teaching of DE 4300772 A1 and U.S. Pat. No. 3,879,288.

Example 23

Hard Water-Boiling Resistance

A certain amount of a 10% polymer solution is added to a calcium chloride solution (33.6° dH pure calcium hardness), heated on a heating plate for 5 minutes and subsequently judged with respect to turbidity. By varying the amount of polymer, the concentration is determined at which a clear solution is obtained for the first time. The indication is given in gram per liter of hard water.

| Example No. | Hard water resistance |
|---|---|
| 1 | 2.0 |
| 10 | 1.5 |
| 11 | 1.5 |
| Comparative Example 2 | 2.0 |
| Commercial product based on a maleic acid/acrylic acid copolymer | 2.0 |

The results clearly demonstrate that the polymers according to the present invention can provide an effective inhibition of boiler scale or similar deposits and that precipitations of components of the hard water can be prevented.

Example 24

Effectiveness as Anti-Deposition Agent

The incrustation potential of deposit-forming solutions and the effectiveness of anti-deposition agents on the incrustation formation is examined in a dynamic method. The pressure changes caused by deposit formation in a spirally wound capillary tube which is placed in a heating bath and flown through by the deposit-forming solution were measured as well as the change in hardness in the deposition-forming solution by means of complexometric titration. The inhibition value results from the ratio of actual hardness to initial hardness of the test solution; and the rate at which depositions are formed results from the pressure change in dependence on the dosage of the anti-deposition agent.

| Polymer Example | Amount of anti-deposition agent [ppm] | | | | | | |
|---|---|---|---|---|---|---|---|
| | 35 | 25 | 20 | 15 | 10 | 7.5 | 5 |
| | % Inhibition | | | | | | |
| 11 | 100 | 100 | 100 | 100 | 100 | 100 | 95 |
| 6 | 100 | 100 | 100 | 100 | 98 | | |
| Comp. Exam. 2 | 86 | | | | | | |
| Commercial product of maleic acid/acrylic acid | 92 | | | | | | |

The measured values show that the polymers according to the present invention have a higher efficiency in this practical test than Comparative Example 2 (according to DE 43 00 772 A1) and than that of the commercial product based on maleic acid/acrylic acid.

Example 25

Iron/Manganese-Binding Capacity

Graded amounts of a 0.25 mole iron(III) chloride solution are added in several test series to solutions of complexing agents consisting of 2.5 ml of a 10% product solution in 150 ml of demineralized water, these are then filled up to 250 ml with demineralized water. In the first test series the pH is set to 7 using 10% sodium hydroxide solution, in the second test series the pH is set to 11. The samples are then left at room temperature and at 95° C. over a defined period of time followed by visual judgment for formation of precipitations. The test period is 3 hours at room temperature and 1 hour at 95° C., after having reached the test temperature. The concentration at which a clear solution is obtained for the first time is determined. The indication is given in mg of iron per gram of polymer.

| Example No. | pH 7/rt | pH 11/rt | pH 7/95° C. | pH 11/95° C. |
|---|---|---|---|---|
| 2 | 394 | 1432 | 473 | 1145 |
| 4 | 597 | 1250 | 611 | 1264 |
| 5 | 668 | 1225 | 696 | 1225 |
| Comp. Exam. 2 | 288 | 1511 | 324 | 576 |

The above Table shows that the polymers according to the present invention have a significantly higher iron binding capacity under all test conditions—with the exception of pH 11/rt—than the products described in DE 4300772 A1. Tests using a manganese(II) salt solution of the same concentration also resulted in an excellent binding capacity of the polymers according to the present invention as compared to products according to DE 43 00 772 A1.

Example 26

Hydrophilic Suspending Capacity

The main task of a cobuilder in detergents is—in addition to the prevention of precipitations—the dispersion of hydrophilic soil particles in the washing liquor. It prevents the soil separated from the fiber during washing from redeposition on the washed articles (anti-redeposition property). This characteristic of cobuilders which is called anti-redeposition power can be determined, for example, by means of the hydrophilic suspending capacity for pulverized iron oxide. Prior to the effective date of the "Regulation on maximum amounts of phosphates in detergents", phosphate salts were used as sole builders because of their excellent suspending properties.

The hydrophilic suspending capacity is determined by photometric turbidity measurement of a suspension consisting of the test substance, an iron oxide pigment, and the surfactant MARLON A (alkyl benzene sulfonate by Hüls AG, Marl, FRG). In a 25 ml-mixing cylinder, fine $Fe_2O_3$-powder (c=40 g/l) is homogeneously dispersed in an aqueous solution of the test substance (c=2 g/l) under addition of MARLON A (c=1 g/l). After 24 hours, 1 ml of solution is withdrawn by means of a 1-ml-syringe at the height of the 20 ml-mark; this solution is diluted with 39 ml of demineralized water, shaken again, and the remaining turbidity is determined photometrically. The extinction $E_{450}$ at 450 nm in a 1-cm-cuvette is measured. The less the dispersion deposits during storage the higher the measured extinction values and the higher the hydrophilic suspending capacity. Sodium tripolyphosphate is used as comparative substance.

| Example | Extinction E450 |
|---|---|
| 2 | 50 |
| 6 | 135 |
| Comparative Example 2 | 40 |
| maleic acid/acrylic acid-copolymer, commercial product | 6 |
| sodium tripolyphosphate | 160 |

The results prove that the polymers according to the present invention—as compared to the polymers of DE 4300772 A1 and commercial acrylic acid/maleic acid-copolymers—have a clearly advantageous activity with respect to the dispersion of hydrophilic particles. Using the polymers according to the present invention it is most surprisingly also possible to come close to the outstanding effective range of sodium tripolyphosphate.

Example 27

Use of the Products According to the Present Invention as Bleaching Stabilizers In the following test the applicability of the polymers according to the present invention as bleaching stabilizers in the bleaching of raw fibers is exemplary demonstrated in the bleaching of viscose. The bleaching process is composed of the steps desizing, acid extraction, and bleaching; their special requirements will be described in the following. The measure for the quality of the bleaching stabilizer is the achieved whiteness of the goods (according to Berger) on the one hand, and the residual hydrogen peroxide content in the liquor, as measured by titration with n/10 $KMnO_4$-solution, on the other hand.

Stabilizer Composition

|  | Active substance [%] | prod. 1 | prod. 2 | prod. 3 |
|---|---|---|---|---|
| lactic acid: | 80 | 12% | 12% | 12% |
| gluconic acid: | 50 | 27% | 27% | 27% |
| Example 2: | 40 | 61% | — | — |
| Example 4: | 40 | — | 61% | — |
| Example 5: | 40 | — | — | 61% |
|  |  | 100% | 100% | 100% |

A. Desizing [acrylate size]
  Formulation:
  liquor ratio: 1:20
  2 g/l Sulfaton UNS new(commercial product of Chemische Fabrik Stockhausen, Krefeld)
  1 g/l [50%-wt.] sodium hydroxide solution
  The complete material to be bleached is treated in the desizing bath at 80° C. for 60 minutes, and subsequently rinsed with hot and cold water.

B. Acid Extraction
  In the acid extraction one of each of the three above-mentioned product mixtures (product 1–3) in a concentration of 0.5 g/l as well as concentrated hydrochloric acid (c=1 ml/l) are added to the desized material (test 1–3) at a liquor ratio of 1:20. At the same time, a comparative sample which does not contain stabilizer is extracted acidically (test 4). All samples are treated at 40–50° C. for 20 minutes and are subsequently cold-rinsed.

C. Bleach
  Bleaching is carried out under the following conditions and in the following steps:
  liquor ratio 1:20
  heating 3° C./minute
  45 minutes at 95° C.
  cooling
  titration of the residual peroxide with n/10$KMnO_4$
  rinsing: hot and cold
  The composition of the individual bleaching baths can be seen in the following Table.

| Bleach bath |  | 1 | 2 | 3 | 4 |
|---|---|---|---|---|---|
| product 1 | g/l | 0.5 | — | — |  |
| product 2 | g/l | — | 0.5 | — |  |
| product 3 | g/l | — | — | 0.5 |  |
| $MgCl_2.6H_2O$ | g/l | 0.4 | 0.4 | 0.4 | 0.4 |
| NaOH [50%-wt.] | g/l | 4 | 4 | 4 | 4 |
| $H_2O_2$ [35%-wt.] | g/l | 8 | 8 | 8 | 8 |
| resid. peroxide | % | 33 | 30 | 40 | 21 |
| whiteness (acc. to Berger) |  | 83 | 83 | 83 | 84 |

The above Table shows that a very good degree of whiteness is achieved with all products according to the present invention. In addition, the comparison of the residual peroxide quantities of tests 1–3 with test 4 clearly shows that all of the products according to the present invention have a stabilizing effect on the bleaching agent and therefore ensure a mild bleach—as is known to the skilled artisan. Moreover, the high residual peroxide content in tests 1–3 shows that a sufficient peroxide quantity is always present during bleaching, even in case of differing raw fiber qualities.

Example 28

Dyeing and Dispersion

Raw cotton ropes are boiled off with 5 ml acetic acid at a liquor ratio of 1:10 for 30 minutes. Subsequently, 200 ml of the liquor is cooled to 60° C. and each of the following is added:

0.5 g/l, 1.0 g/l and 2 g/l of polymer according to Example 2

0.05 g/l indanthrene blue BC Coll 20.0 ml/l NaOH, 50%, and 5.0 g/l hydrosulfite, conc.

After a residence time of 15 minutes (at 60° C.), the liquor was sucked off by a "Blauband-Filter" [blue-band-filter] and evaluated visually. The polymers show a good dispersive activity; in the concentrations used they prevent precipitation of flocculates.

Example 29

Washing of Dyed Material

At a liquor ratio of 1:20 and a temperature of 70°–80° C. black-dyed PES-flake was treated with a liquor of 1 g/l polymer according to Example 2 and 1 g/l SOLOPOL DP (fatty amine ethoxylate, trade name of Chemische Fabrik Stockhausen GmbH, Krefeld) for 20 minutes; it was then subjected to hot and cold rinsing. Oligomers, color and fiber dust were removed from the fibers to a great extent.

Example 30

Manufacture of Leather

In the following it is demonstrated that the polymers according to the present invention are suitable for the leather manufacture; the retannage/fat-liquoring of upper leather is used as example. The softness of the leather, the grain tightness and the fullness are used as assessment criteria. The polymers according to Examples 2, 4, 5 were tested with good results in comparison with a commercial retanning agent based on polyacrylic acid/acrylamide and a polymer according to Comparative Example 2. These good results elucidate the suitability of the polymers according to the present invention in the manufacture of leather.

Sequence of retanning/fat-liquoring

Material: wet-blue, thickness: 1.8–2.0 mm The following %-indications relate to the shaved weight.

| Retanning: | 200.0% | water 45° C. | | |
| | 2.0% | Chromosal ® B[1)] | | |
| | 2.0% | Blancorol ® RC[2)] | undissolved | 60 min. |
| Drain off bath, separate leather | | | | |
| Neutralization: | 100.0% | water 35° C. | | |
| | 1.0% | sodium formate | undissolved | 30 min. |
| | 0.5% | sodium bicarbonate | 1:10 | 60 min. |
| | | pH: 5.0 | | |
| Retanning/Dyeing: | 1.1% | polymer-act. subst. | 1:3 | |
| | 3.0% | Mimosa[3] | undissolved | |
| | 3.0% | Tanigan ® OS[4] | undissolved | 30 min. |
| | 1.0% | Baygenal ® Braun LNR[5] | 1:20, hot | 30 min. |
| Drain off bath | | | | |
| Rinsing: | | water 60° C. | | 10 min. |
| Fat-liquoring: | 100% | water 60° C. | | |
| | 7.0% | Coripol ® RS[6)] | 1:4 | |
| | 2.0% | Coripol ® BZN[7)] | 60° C. | 60 min. |
| | 1.5% | formic acid | 1:5 | 30 min. |
| Final pH-value: 3.1–3.3 | | | | |

Leather horse up overnight, setting-out, vacuum drying at 75° C./2 min., conditioning, staking 1: bas. chromium(III) salt, 2: chromium(III) salt/org. fixing agent, 3: natural tanning agent of mimosa extract, 4: neutral tanning agent, Syntan, 5: brown dyestuff, 6: fat-liquoring and greasing agent of natural and synthetic fats, 7: mixture of natural fat and lanolin.

| | Polymer according to Example | | | | Commercial |
| --- | --- | --- | --- | --- | --- |
| retanning test: | 2<br>N1 | 4<br>N2 | 5 | Comp. 2<br>N3 | polymer<br>N4 |
| softness* | 2– | 2–3 | | 2 | 2 |
| grain tightness* | 2–3 | 2–3 | | 3 | 3 |
| shade | brown | slightly grayer than N4 | | slightly brighter than N4 | brown |
| retanning test: | N5 | N6 | | N7 | N5 |
| softness* | 2–3 | 2–3 | | 2– | 2 |
| grain tightness* | 2 | 2 | | 2–3 | 2– |
| shade | brown | slightly darker than N4 | | slightly yellowish-brown | brown |

*Priority of rating 1–6, with 1 being the best

Example 31

Dispersing Tests

In order to demonstrate the dispersing capacity of the copolymers according to the present invention on pigment suspensions, talcum (Finntalc C10 by OMYA) was stirred into aqueous copolymer solutions of pH 12 until a pigment content von 66% was achieved, the viscosity was measured immediately and after 7 days; the stirrability was graded with 1–6. The combination of POLYSALZ S/LUMITEN P-T (by BASF AG) was used as state of the art. The addition of the dispersing agent amounted to 0.2%/abs. dry pigment, and in the case of POLYSALZ/LUMITEN concentrations usual in practice were used: 0.15/1.0%/ abs. dry pigment.

Polymers according to the present invention of Example 6 and 11 were tested and showed stable to slightly falling viscosities over the measuring period with a good to satisfactory stirrability. For this reason they are absolutely suitable for this purpose.

What is claimed is:

1. A water-soluble copolymer comprising a —C—C— backbone and at least one hydroxyl group covalently bonded to the backbone, wherein the copolymer is comprised of the following monomers radically copolymerized in a first aqueous medium:
    25 to 55% by weight of (a), which comprises at least one monoethylenically unsaturated $C_{4-8}$ dicarboxylic acid and/or a salt thereof;
    30 to 60% by weight of (b), which comprises at least one monoethylenically unsaturated $C_{3-10}$ monocarboxylic acid and/or a salt thereof;
    1 to 15% by weight of (c), at least one monoethylenically unsaturated monomer comprising a moiety, wherein the moiety is susceptible to conversion to a hydroxyl group that is covalently bonded to the —C—C— backbone of the copolymer by acid hydrolysis or base saponification of the moiety in a second aqueous medium; and
    15 to 40% by weight of (d), which comprises at least one monoethylenically unsaturated monomer comprising a sulfonic acid group and/or a salt thereof or a sulfate group and/or a salt thereof, and
    wherein at least one of said moiety of monomer (c) is converted, after the polymerization, to a hydroxyl group covalently bonded to the C—C— backbone of the copolymer by acid hydrolysis or base saponification in an aqueous medium.

2. A water-soluble copolymer comprising a —C—C— backbone and at least one hydroxyl group covalently bonded to the backbone wherein the copolymer is comprised of the following monomers radically copolymerized in a first aqueous medium:
    (a) comprises at least one monomer selected from the group consisting of maleic acid, itaconic acid, fumaric acid and salts thereof;
    (b) comprises at least one monomer selected from the group consisting of acrylic acid, methacrylic acid and salts thereof;
    (c) comprises at least one monomer selected from the group consisting of vinyl acetate, vinyl propionate, acetic acid-methyl vinyl ester, methyl vinyl ether, ethylene glycol monovinyl ether and vinylidene carbonate;

(d) comprises at least one monomer selected from the group consisting of (meth)allyl sulfonic acid, vinyl sulfonic acid, styrene sulfonic acid, acrylamidomethylpropane sulfonic acid, hydroxyethyl(meth)acrylate sulfate, (meth)allyl alcohol sulfate and salts thereof; and wherein at least one of said monomer (c) is converted, after the polymerizatio, to a hydroxyl group covalently bonded to the —C—C— backbone of the copolymer by acid hydrolysis or base saponification in an aqueous medium.

3. A water-soluble copolymer comprising a —C—C— backbone and at least one hydroxyl group covalently bonded to the backbone wherein the copolymer is comprised of the following monomers radically copolymerized in a first aqueous medium:

(a) comprises maleic acid and/or a salt thereof;

(b) comprises acrylic acid and/or a salt thereof;

(c) comprises vinyl acetate; and (d) comprises (meth)allyl sulfonic acid and/or a salt thereof wherein at least one of said monomer (c) is converted, after the polymerization, to a hydroxyl group covalently bonded to the —C—C— backbone of the copolymer by acid hydrolysis or base saponification in an aqueous medium.

* * * * *